May 8, 1962 — J. M. LUCAS — 3,033,772
CHLORINE CELL
Filed Aug. 19, 1959

INVENTOR.
JOSEPH M. LUCAS

BY

ATTORNEY

United States Patent Office 3,033,772
Patented May 8, 1962

3,033,772
CHLORINE CELL
Joseph M. Lucas, Cuyahoga Falls, Ohio, assignor to The United States Stoneware Co., Tallmadge, Ohio, a corporation of Ohio
Filed Aug. 19, 1959, Ser. No. 834,889
7 Claims. (Cl. 204—278)

This invention relates to an improved electrolytic chlorine cell.

The cover of this cell must withstand continued contact with high concentrations of wet chlorine at temperatures of, for example, 100 to 225° F.

According to this invention the cover of the cell is made of a natural sandstone in which the quartz content is at least substantially 80 percent. Quartzose sandstone (sometimes called orthoquartzite), an Ohio deposit of the Mississippian age, or its equivalent, is preferred because it is most resistant to wet chlorine at the temperatures encountered in the upper part of a chlorine cell. Alternatively, a sandstone of lower quartz content down to 30 or 40 percent such as graywacke may be used if its surface is first coated by impregnation with an inorganic or organic material which may be a type of water glass or other impregnant used in the construction industries, etc. or a plastic composition such as a resinous adhesive, e.g. a polyester or epoxy resin, etc. Sodium or potassium silicate is preferred. The impregnating treatment may be applied to sandstones of higher quartz content, including, for example, subgraywacke and even quartzose to increase their strength.

The cover may be a single slab of the stone, or several pieces which may or may not be fastened together by dowel pins or a chemically resistant cement or the like. Openings may be made through the sandstone cover, as required, for the electrodes, etc., or these may be fastened below the cover. It is not practical to make the vessel of sandstone not only because of fabrication difficulties, but also because direct contact of the liquid of the cell with sandstone would cause absorption or permeation of the liquid, and failure of the cell structure.

The outline of the cover, the number of parts comprising it, whether or not it is provided with openings are not critical features of the invention. The cover may be planar, arched or domed, etc.

The cell may be square, rectangular or cylindrical. It may be as small as 2 feet across, or as much as 5 feet or more across and may be several feet (up to 4 or 5 feet, for example) tall. Ordinarily, the cover will be about 1 to 2 inches thick. A relatively thick cover is desirable for insulation so that a substantially uniform temperature is maintained in the cell.

If the sandstone is treated with sodium or potassium silicate, all fabrication is first completed. The sandstone is then immersed in the silicate. The treating solution may contain about 5 to 20 percent of the silicate measured as metal oxide (e.g. 6 to 20 percent of $Na_2O$ or 7 to 14 percent $K_2O$) by weight. The treatment is usually carried out at room temperature, and the stone is allowed to soak for 6 or 24 hours, or thereabouts. Longer soaking does no harm. Impregnation may be accelerated by applying a vacuum to the surface of the stone opposite that being treated. On removal from the treating bath the stone is dried, preferably by heating to a temperature above the boiling point of water, e.g. by heating to 224° F. for 10 to 24 hours. Acid washing after drying makes the stone more acid resistant in subsequent service, but is not necessary. The treatment is preferably applied by complete immersion of the sandstone. The silicate treatment affects only the surface of the stone. It increases the mechanical strength of the stone, as well as increasing the chemical resistance of stones of lower quartz content.

Although the size and shape and general design of the cell are not critical, the drawings illustrate the invention.

In the drawings—

Figure 1:
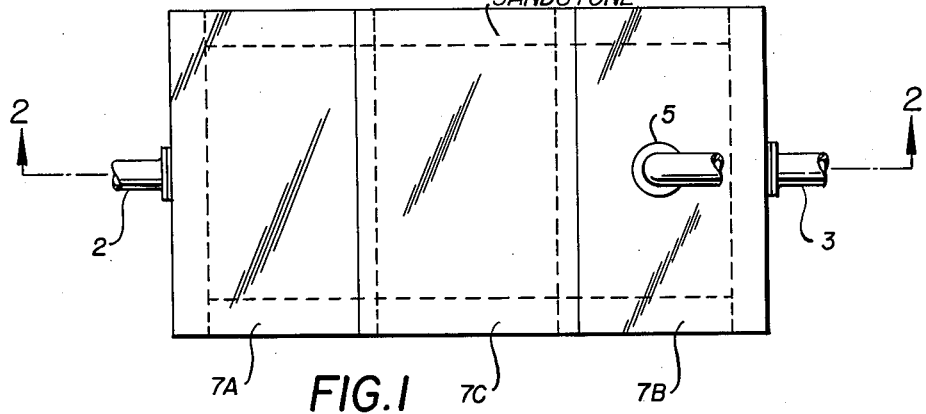
FIG. 1 is a plan view of a cell.
Figure 2:
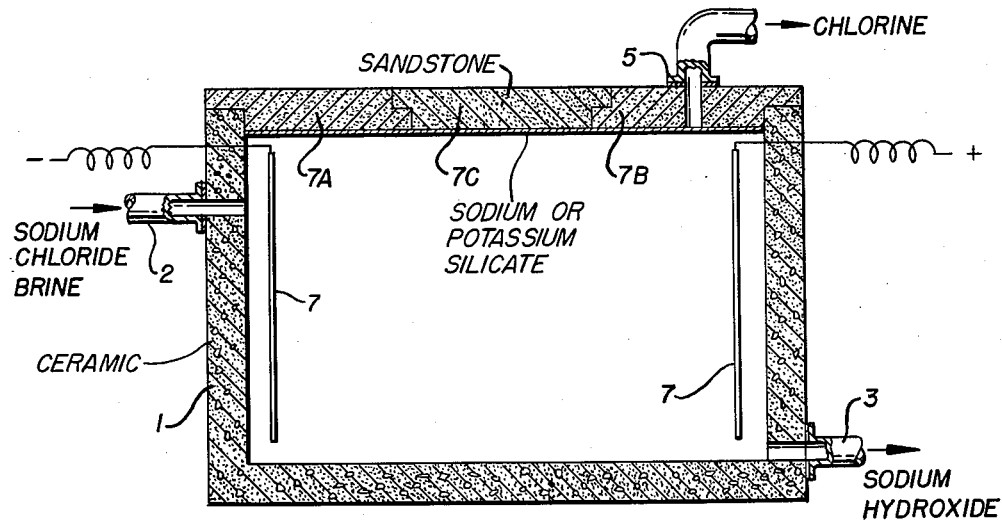
FIG. 2 is a section through the line 2—2 of FIG. 1.

The body 1 of the vessel may be of any usual construction, such as a poured ceramic structure, tile, etc. As shown, it is provided in any usual manner with an inlet 2 for sodium chloride brine and an outlet 3 for sodium hydroxide. The brine inlet may be located in the cover. The chlorine outlet may be through the wall of the vessel but is shown as comprising a flanged pipe fitting 5 over a hole in the cover. The flange may be cemented or screwed or bolted in place. Alternatively, the fitting may line the opening through the sandstone. The electrodes 7 (shown diagrammatically) are supported by suitable means (not shown) and preferably pass through the cover. The drawing is largely schematic because the novelty lies in the composition of the cover.

The cover is of sandstone or sandstone impregnated with water glass. It is shown as being made in three parts. The end sections 7A and 7B are stepped down at their inner edges and support the central section 7C the bottom edges of which have been cut away so that the central section 7C fits snugly on the outer sections 7A and 7B. After being put in place the seams between the difference sections are advantageously sealed with a cement. Silicate cements are suitable for the purpose. They are resistant to chlorine attack and when set the cover becomes monolithic. Polyester adhesives, etc. might be used.

Figure 3:
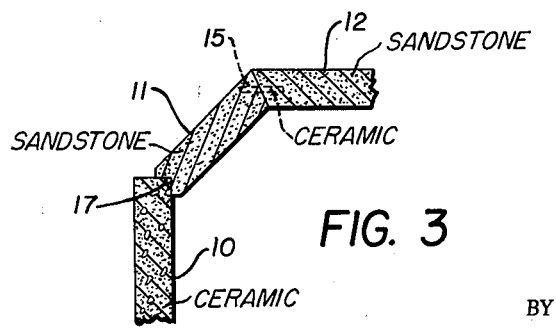
FIG. 3 is a detailed section through a modification in which the cover is domed.

The ceramic wall 10 of FIGURE 3 is the wall of a cell. Instead of being flat, the cover is fabricated of slanting pieces of sandstone 11 and a flat sandstone cover piece 12 held together by dowel pins 15. Domed covers of the general type are common in the industry. The pins 15 may be of ceramic composition, preferably of high alumina content. The lower edge of the pieces 11 is rabbetted at 17 to engage the corner of the wall 10, but any other suitable construction may be used. The seams between the parts of the cover and between the cover and the cell may be cemented.

In the structures shown, the sandstone may be unimpregnated, or impregnated as described.

The invention is covered in the claims which follow.

What I claim is:

1. An electrolytic cell equipped with electrodes for the generation of chlorine, the cover of which cell is from the class of materials consisting of natural sandstones with a quartz content of at least 80 percent, and natural sandstones with a quartz content of at least 30 percent at least the undersurface of which has a chlorine-resistant covering.

2. The cell of claim 1 in which the covering of the cover is from the class consisting of sodium and potassium silicates.

3. The cell of claim 1, the cover of which is composed of several mating parts.

4. The cell of claim 1 in which the cover is made of a multiplicity of parts held together at least in part by a dowel pin of a ceramic composition of high alumina content.

5. An electrolytic cell equipped with electrodes for the generation of chlorine, the cover of which cell is quartzose sandstone.

6. An electrolytic cell equipped with electrodes for the generation of chlorine, the cover of which cell is a natural sandstone with a quartz content of at least 30 percent treated on at least the undersurface with a silicate of the class consisting of sodium and potassium silicates.

7. An electrolytic cell equipped with electrodes for the generation of chlorine, the central portion of the cover of which is natural sandstone with a quartz content of at least 30 percent.

References Cited in the file of this patent
UNITED STATES PATENTS 2,865,834    Ross _____ Dec. 23, 1958

OTHER REFERENCES

Industrial Minerals and Rocks, 2nd ed., The Amer. Institute of Mining and Metallurgical Engineers, N.Y., 1949, pp. 328–329.